(12) United States Patent
Thorp

(10) Patent No.: X3361
(45) Date of Patent: Aug. 10, 1821

(54) BRAIDING

(76) Inventor: John Thorp

John Thorp.

Letters Patent.

The schedule referred to in these Letters Patent and making part of
the same containing a description in the words of the said [illegible]
himself of his improvement being a Braiding Machine This machine consists of wheels, the number of which is in proportion to
the kind of braid or the number of strands that forms it. These wheels
are placed in a circular form, so that the carriers will have a direction
pointing to the centre where the braid is formed. The inner surfaces
of said wheels are concave, forming a curve corresponding with the
circle on which they stand, and are of an equal thickness connected one
with another, by cogs causing them to turn all together, and accurately
on their centres, each forming its revolution in a proper time, —

There are two plates whose surfaces form the same curve of the said
wheels, one of which has a shaft confined to, and extending from its
centre, passing loosely through the centre of the other steadying it
These plates, when together, constitute what I call a carrier, and is that
part of the machine, which contains and carries a spool, bobbin or a
strand; and are as many in number as the threads or strands required
to form the braid, each of which is placed astride upon the rims of said
wheels, and is pressed together by a spring, which causes them to pinch the
wheels producing a friction sufficient to hold them in their places, and is carried
round in their proper rout by the wheels in [illegible] turn shifting in their
[illegible] from one wheel to another, which is effected by arms
or studs. These arms or studs are confined, one to the car-
rier, and another steadfastly fixed to some permanent part of the frame,
with its point extending so near to where the rims of the wheels come
in contact as to interfere with the point of the one belonging to
the carrier; and their position are such as to cross the said carriers from the rim of one wheel on to the rim of another; and
so on round, from wheel to wheel alternately forming the braid
In the rims of said wheels are notches in which the shaft of the carriers
lie, and by which they are steadied in their circulation, These not-
ches are so arranged as to come exactly opposite each other, ad-
mitting the shaft of the carriers to pass between the wheels as they
turn, There are other small notches in said wheels which receive
a projection from the carriers, serving also to keep them in their place.
Said Machine is capable of making nearly all kinds of braid, such as whip
thongs, both single and twilled also the flat braids, single and twilled,
cords &c and will work from three strands to almost any num-
ber; and being constructed to operate without shuttles, renders it
subject to no sudden vibration, nor abruptness in its operation; as the
strands or threads that form the braid all circulate regularly, with-
out obstruction or impediment of motion, ..

To convert one of these machines, which is calculated for braid
-ing cords into one that will form a flat braid, no other alteration is
necessary than to deprive it of a part of its wheels, letting the carriers
return back and forth, instead of continuing round the whole circle
It is however necessary in making flat braid, to have the outside
or end wheels either smaller or larger, so as not to lodge the carriers in the
same place from which they were taken, .. The braid is taken forward
by a weight or feeding rollers Witnesses                                                  John Thorp William [illegible] Atkin
William Read Shepley

[illegible]
[illegible]

Ret (Augt. 10. 1821 Patented)

DRAFTSMAN'S DIVISION.

All communications should be addressed to "The Commissioner of Patents, Washington, D. C."

2—328 *a.*

*DEPARTMENT OF THE INTERIOR,*

United States Patent Office.

*Washington, D. C.,* ................................ *, 189*__

*SIR:*

*The printed* copies ................ *of Patent No.* Thorpe Aug 10, 1821 are *exhausted.*

*As soon as reprinted a copy will be mailed you to complete your order.*

*By direction of the Commissioner:*

*Very respectfully,*

................................

*Chief Clerk.*

3143b6-97-5m